Patented Mar. 2, 1926.

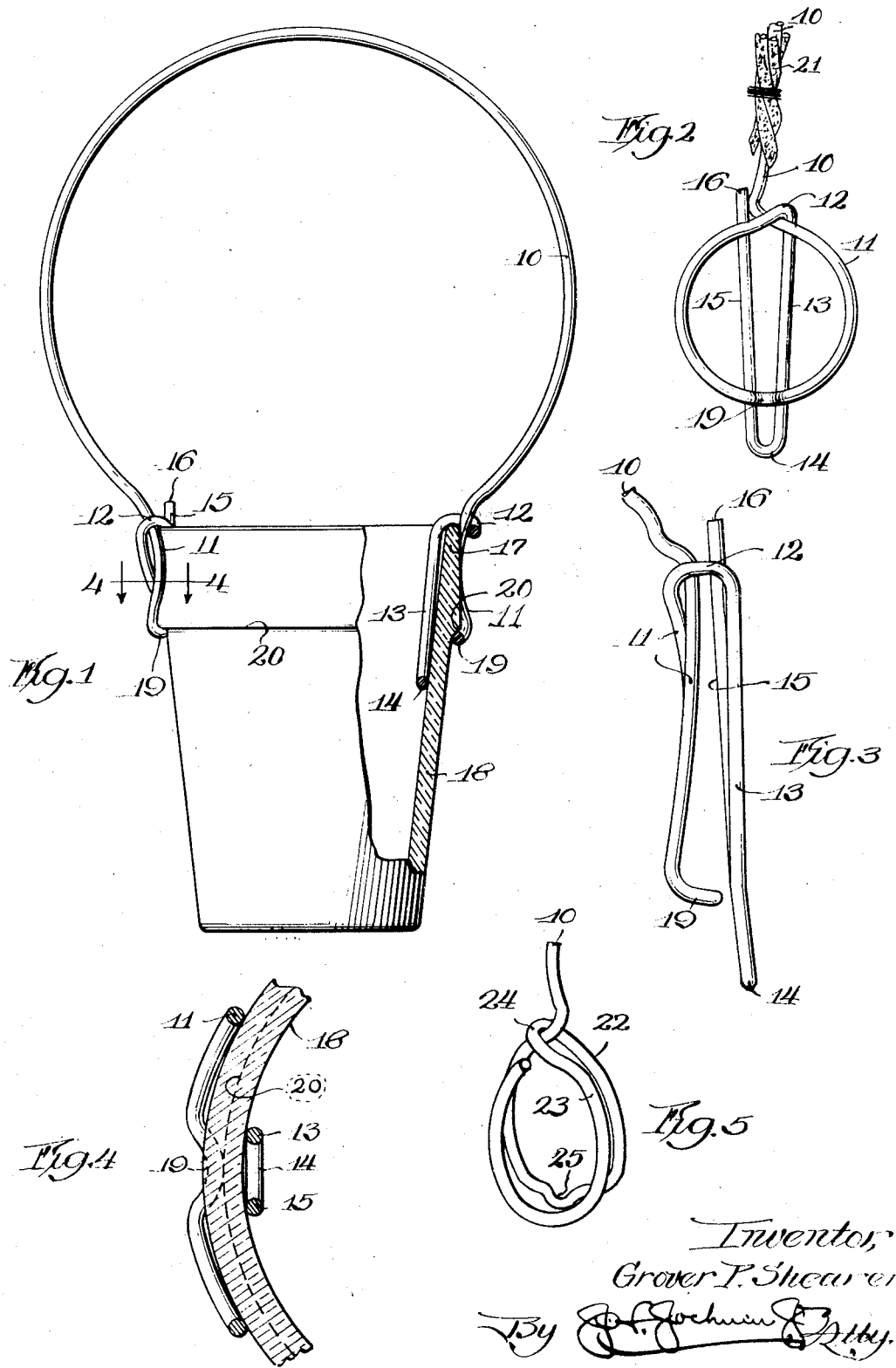

1,575,232

UNITED STATES PATENT OFFICE.

GROVER P. SHEARER, OF CHICAGO, ILLINOIS, ASSIGNOR TO A. L. RANDALL COMPANY, OF CHICAGO, ILLINOIS, A CORPORATION OF ILLINOIS.

HANDLE OR HANGER FOR FLOWERPOTS AND THE LIKE.

Application filed May 28, 1925. Serial No. 33,344.

*To all whom it may concern:*

Be it known that I, GROVER P. SHEARER, a citizen of the United States, residing at Chicago, in the county of Cook and State of Illinois, have invented certain new and useful Improvements in Handles or Hangers for Flowerpots and the like, of which the following is a specification.

This invention relates to improvements in handle or hanger for flower pots, bulb boxes and the like, and one of the objects of the invention is to provide an improved handle or hanger of this character which may be readily and detachably secured to a flower pot or the like, for the purpose of transporting or hanging the pot, and which handle may be employed as a support for some ornamentation or as a trellis for the plant, flowers or vines contained within the pot, and may also be used for the purpose of causing the pot to have the appearance of a basket.

A further object is to provide an improved handle or hanger of this character which may be readily applied to a pot of any size, within predetermined limits, and without interfering with or injuring the plant, and without danger of the handle becoming accidentally detached therefrom when the pot is raised or transported by the handle.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which—

Figure 1 is a view partly in elevation and partly broken away of a handle of this character constructed in accordance with the principles of this invention, and showing the same as applied to a flower pot.

Figure 2 is an enlarged detail side elevation of one end of the handle.

Figure 3 is an enlarged detail end view of Figure 2.

Figure 4 is a detail sectional view taken on line 4—4, Figure 1.

Figure 5 is a detail perspective view of a modified form of the invention.

Referring more particularly to the drawing the numeral 10 designates generally the handle or hanger which is constructed of any suitable pliable material such as wire or the like, and which may be of any desired size and shape.

A portion of the body of the handle adjacent one end is bent so as to form a loop 11 of any desired configuration and size. The end of the body is then bent over the loop as at 12 and preferably adjacent the point at which the loop is formed on the handle. The material is then bent in a direction substantially transverse to the bend 12 so as to extend across the loop as at 13 and preferably to a point below the loop as at 14. The end of the material is then bent back upon itself as at 15 and is preferably spaced from the portion 13. The extremity 16 of the end 15 preferably terminates in close proximity to the body portion of the handle.

The bend 12 may be of any desired length so that the loop 11 and the bends constituting the portions 13 and 15 will form resiliently spaced members between which members the edge 17 of a receptacle 18, such as a flower pot or the like, may be passed.

One of these fastening devices or loops is provided at each end of the body portion of the handle and the handle is adapted to be secured to the receptacle 18 by passing the respective ends over the edge of the receptacle, the resiliency of the material permitting the spaced members to yield so that the edge of the receptacle will pass therebetween.

One of the members, preferably the loop 11, is shaped to form an inwardly projecting portion 19 which extends in a direction across the space between the two members. This portion 19 forms a shoulder which is adapted to engage under a shoulder 20 formed on the wall of the receptacle 18.

In use, the loop 11 is adapted to stand adjacent the outer face of the receptacle while the member formed by the portions 13 and 15 is adapted to engage the inner face of the wall of the receptacle and to readily pass into the earth which may be contained within the receptacle 18.

The members 15 and 13 are preferably arranged so that they diverge from the extremity 14 to insure a ready insertion thereof into the earth of the receptacle. At the same time the members 13 and 15 will not interfere with or injure the plant, and will permit the handle to be readily detached from the receptacle 18.

The resiliency of the material and especially by reason of the bend 12, causes the shoulder 19 to be detachably held beneath the shoulder 20 on the receptacle.

Obviously any form of ornament may be secured to the handle 10 and the latter be employed as a trellis over which the vines or plants may be trained, as well as serve the purpose of a handle or hanger for the receptacle.

A covering 21 of any suitable material such as rattan or the like, may be coiled about the body portion of the handle 10 and secured thereto in any suitable manner.

In the form of the invention shown in Figure 5, the resiliently spaced members 22 and 23 are of substantially the same configuration and are connected together by means of the portion 24 which passes over the loop formed by the member 22, and the member 22 is provided with an offset portion 25 shaped to form a shoulder extending in a direction across the space between the members 22 and 23.

The loops 11 and 22 are preferably of a considerable diameter so that they will project laterally beyond the body portion of the handle 10 so as to constitute an extended bearing surface against the outer face of the receptacle 18, as shown more clearly in Figure 4, for the purpose of holding the handle 10 in a proper position with respect to the receptacle and to prevent the same from rocking or falling down.

While the preferred forms of the invention have been herein shown and described, it is to be understood that various changes may be made in the details of construction and in the combination and arrangement of the several parts, within the scope of the claims, without departing from the spirit of this invention.

What is claimed as new is:—

1. A handle of the character described embodying a body, a portion of the body being bent to form a loop at a point remote from the end of the body, then in a direction transverse to and across the loop, and then in a direction adjacent and substantially parallel with the loop and spaced therefrom to form laterally spaced members adapted to receive the edge of a receptacle therebetween, one of said members being shaped to form a laterally projecting shoulder extending in a direction across the space between the members and adapted to engage under a shoulder on the said edge of the receptacle.

2. A handle of the character described embodying a body, a portion of the body being bent to form a loop at a point remote from the end thereof, then in a direction transverse to and across the edge of the loop, then in a direction transverse to the last recited bend, across the loop and beyond the edge of the loop to form laterally and resiliently spaced members adapted to receive the edge of a receptacle therebetween, and a shoulder on one of the said laterally spaced members adapted to engage under a shoulder on the said edge of the receptacle.

3. A handle of the character described embodying a body, a portion of the body being bent to form a loop at a point remote from the end thereof, then in a direction transverse to and across the edge of the loop, then in a direction transverse to the last recited bend, across the loop and beyond the edge of the loop to form laterally and resiliently spaced members adapted to receive the edge of a receptacle therebetween, and a shoulder on one of the said laterally spaced members adapted to engage under a shoulder on the said edge of the receptacle, the said loop being of a shape to form an extended bearing against the adjacent face of the said edge of the receptacle in a direction transverse to the body portion of the handle.

4. An handle of the character described formed from a piece of material uninterrupted from one end to the other end thereof, each end of said material being bent to form spaced members resiliently connected at a point remote from the lower extremities of the members and adapted to receive the edge of a receptacle therebetween, the sides of one of said members being laterally spaced and joined at their extremities to form an extended bearing against the outer face of the receptacle, the other of said members being formed by bending the extremity of the said material back upon itself to form spaced portions extending in a direction across the first said member and projecting therebelow, and a hook shaped portion on one of the members to engage under a shoulder on the receptacle to detachably secure the handle to the receptacle.

In testimony whereof I have signed my name to this specification, on this 16th day of April, A. D. 1925.

GROVER P. SHEARER.